United States Patent
Okuaki et al.

(10) Patent No.: US 10,116,251 B2
(45) Date of Patent: Oct. 30, 2018

(54) MOTOR DRIVE DEVICE AND MOTOR DRIVING METHOD

(71) Applicant: FANUC CORPORATION, Yamanashi (JP)

(72) Inventors: Kenichi Okuaki, Yamanashi (JP); Kazuhiro Yamamoto, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 15/723,404

(22) Filed: Oct. 3, 2017

(65) Prior Publication Data

US 2018/0102727 A1   Apr. 12, 2018

(30) Foreign Application Priority Data

Oct. 6, 2016 (JP) .................................. 2016-198058

(51) Int. Cl.
| | |
|---|---|
| G05D 23/00 | (2006.01) |
| H02P 29/68 | (2016.01) |
| G08B 21/18 | (2006.01) |

(52) U.S. Cl.
CPC ............ H02P 29/68 (2016.02); G08B 21/187 (2013.01)

(58) Field of Classification Search
CPC ........ G05D 23/00; G05D 23/02; G05D 23/20; G05D 23/27; H02P 29/0088; H02P 29/0055; H02P 29/022; H02P 23/14; H02P 29/0044; H02P 29/68; H02P 1/00; H02P 3/00; H02P 6/00; H02P 1/46; H02P 3/18; H02P 21/00; H02P 23/00; H02P 27/00;

(Continued)

(56) References Cited

U.S. PATENT DOCUMENTS

| 9,496,818 | B2 | 11/2016 | Sasaki | |
|---|---|---|---|---|
| 9,985,570 | B2 * | 5/2018 | Endoh | ..................... H02P 29/64 |
| | | | | 318/400.02 |
| 2014/0285131 | A1 | 9/2014 | Sasaki | |

FOREIGN PATENT DOCUMENTS

| JP | 07-194094 | 7/1995 |
|---|---|---|
| JP | 2007-202296 | 8/2007 |

(Continued)

OTHER PUBLICATIONS

Reasons for Refusal dated Jul. 10, 2018 in Japanese Patent Application No. 2016-198058.

*Primary Examiner* — Antony M Paul

(74) *Attorney, Agent, or Firm* — Wenderoth, Lind & Ponack, L.L.P.

(57) ABSTRACT

A motor drive device, which supplies electric power from a power element to a motor, and dissipates heat of the power element by way of a heat sink, includes a temperature detector that detects the actual temperature of the heat sink and an electric current detector that detects electric current from the power element to the motor. An actual temperature variation calculation unit calculates an actual temperature variation of the heat sink relative to time from the actual temperature, and an estimated temperature variation calculation unit calculates an estimated temperature variation of the heat sink relative to time from the estimated temperature. A temperature abnormality determination unit determines a temperature abnormality of the heat sink according to whether or not the actual temperature variation is departing from a permitted range based on the estimated temperature variation.

8 Claims, 4 Drawing Sheets

(58) Field of Classification Search
CPC .......... H02P 41/00; H02P 27/04; H02P 27/06;
H02H 5/04; H02K 11/0047; G05B 5/00
USPC .......... 318/471, 472, 400.01, 700, 701, 727,
318/800, 801, 430; 700/52, 153, 202,
700/205, 299
See application file for complete search history.

(56) References Cited

FOREIGN PATENT DOCUMENTS

| | | |
|---|---|---|
| JP | 2012-115081 | 6/2012 |
| JP | 2014-187789 | 10/2014 |

\* cited by examiner

MOTOR DRIVE DEVICE AND MOTOR DRIVING METHOD

This application is based on and claims the benefit of priority from Japanese Patent Application No. 2016-198058, filed on 6 Oct. 2016, the content of which is incorporated herein by reference.

BACKGROUND OF THE INVENTION

Field of the Invention

The present invention relates to a motor drive device and a motor driving method.

Related Art

Conventionally, in motor drive devices for driving the feed shaft of a machine tool, the arm of an industrial robot, etc., it is important to prevent various defects due to heat generation of a power element supplying electric power to a motor (malfunction of power element, shortening of component lifespan, decline in operating rate of motor drive device, etc.) before it happens. For this reason, generally, the heat sink (radiator plate) is attached to the power element which is a heat generation source, and prompts heat dissipation of the power element by natural convection. Furthermore, by jointly using a cooling fan with this heat sink, the heat dissipation of the power element is greatly promoted by forced convection.

However, with such a motor control device, failures may occur in the heat dissipation route of the power element during use thereof. These failures can be considered by dividing into temperature abnormality of the heat sink, and rotation abnormality of the cooling fan. As the cause of temperature abnormality of the heat sink, for example, dust or cutting fluid adhering to the fan in the vicinity of the inlet of the heat sink accompanying forced convection by a cooling fan, and clogging therein occurring can be exemplified.

As methods of detecting failure of the heat dissipation route in such a way, there is a method (hereinafter referred to as Prior Art 1) of detecting the actual temperature of the heat sink as well as calculating an estimated temperature of the heat sink, and determining the existence of abnormality by whether or not the difference between this actual temperature and estimated temperature exceeds a predetermined threshold (for example, refer to Patent Document 1).

In addition, a method (hereinafter referred to as Prior Art 2) related to a cooling fan for cooling a switching element of an inverter device applied to an elevator has been proposed that compares a measured value and predicted value for the temperature of a heat sink to detect abnormality thereof, and determines whether an abnormality is occurring in the cooling fan according to the comparison results thereof (for example, refer to Patent Document 2).

Patent Document 1: Japanese Unexamined Patent Application, Publication No. 2014-187789
Patent Document 2: Japanese Unexamined Patent Application, Publication No. 2012-115081

SUMMARY OF THE INVENTION

However, with Prior Art 1, since the existence of an abnormality is determined based simply on the difference between the actual temperature and estimated temperature of the heat sink, if the threshold for determining the existence of abnormality is not set well, it may not appropriately perform detection of the abnormality. For example, if this threshold is too small, it will tend to misjudge as an abnormality occurring, despite an abnormality not actually occurring. Conversely, if this threshold is too large, it will take time until detecting an abnormality, and the detection of an abnormality cannot be rapidly performed.

It should be noted that, upon determining the existence of an abnormality, Patent Document 1 describes detecting the actual temperature of the heat sink via a temperature detection part, as well as calculating the estimated temperature of the heat sink by detecting the electric current value via an electric current detection part. However, in practice, a motor may repeat acceleration and deceleration in a machine tool during operation, etc., and in this case, since the amount of heat generation of the motor will not be constant, and it will not be possible to accurately calculate the estimated temperature of the heat, there is concern over determining the existence of an abnormality becoming difficult.

On the other hand, Prior Art 2 merely includes technology for detecting an abnormality of a cooling fan, rather than a heat sink. In other words, although the measured value and predicted value for the temperature of the heat sink are compared in Prior Art 2, the object thereof is to detect abnormality of the cooling fan, and not to detect abnormality of the heat sink.

The present invention takes into account such a situation, and has an object of providing a motor drive device and motor driving method capable of precisely detecting abnormality of a heat sink.

A motor drive device (for example, the motor drive device 1 described later) according to a first aspect of the present invention is a motor drive device that supplies electric power from a power element (for example, the power element 2 described later) to a motor (for example, the motor 3 described later), and dissipates heat from the power element by way of a heat sink (for example, the heat sink 5 described later), including: a temperature detection unit (for example, the temperature detection unit 11 described later) that detects an actual temperature of the heat sink; an electric current detection unit (for example, the electric current detection unit 12 described later) that detects electric current from the power element to the motor; an actual temperature variation calculation unit (for example, the actual temperature variation calculation unit 13 described later) that calculates an actual temperature variation of the heat sink relative to time, from the actual temperature of the heat sink detected by the temperature detection unit; an estimated temperature variation calculation unit (for example, the estimated temperature variation calculation unit 14 described later) that calculates an estimated temperature variation of the heat sink relative to time, from an estimated temperature of the heat sink calculated based on the electric current detected by the electric current detection unit; and a temperature abnormality determination unit (for example, the temperature abnormality determination unit 15 described later) that determines existence of a temperature abnormality in the heat sink, according to whether or not the actual temperature variation calculated by the actual temperature variation calculation unit is departing from a permitted range based on the estimated temperature variation calculated by the estimated temperature variation calculation unit.

According to a second aspect of the present invention, in the motor drive device as described in the first aspect, the temperature abnormality determination unit may determine that a temperature abnormality of the heat sink occurred, in a case of a difference between the actual temperature variation calculated by the actual temperature variation calculation unit and the estimated temperature variation calculated by the estimated temperature variation calculation unit exceeding a predetermined threshold.

According to a third aspect of the present invention, in the motor drive device as described in the first or second aspect, the heat sink may have a flow channel of fluid, and the motor drive device may further include a cooling fan (for example, the cooling fan 6 described later) causing the fluid in the flow channel of the heat sink to flow; and a rotation abnormality determination unit (for example, the rotation abnormality determination unit 16 described later) that determines existence of a rotation abnormality in the cooling fan.

According to a fourth aspect of the present invention, the motor drive device as described in the third aspect may further include an abnormality determination unit (for example, the abnormality determination unit 17 described later) that determines existence of a temperature abnormality of the heat sink or a rotation abnormality of the cooling fan, based on determination results of the temperature abnormality determination unit and the rotation abnormality determination unit.

According to a fifth aspect of the present invention, in the motor drive device as described in the fourth aspect, the abnormality determination unit may determine that an abnormality location is the heat sink, in a case of being determined that a rotation abnormality of the cooling fan is not occurring by way of the rotation abnormality determination unit, and being determined that a temperature abnormality of the heat sink occurred by way of the temperature abnormality determination unit.

According to a sixth aspect of the present invention, the motor drive device as described in any one of the third to fifth aspects may further include an abnormality signal generation unit (for example, the abnormality signal generation unit 18 described later) that generates an abnormality signal, in a case of being determined that a temperature abnormality of the heat sink or a rotation abnormality of the cooling fan occurred by way of the temperature abnormality determination unit or the rotation abnormality determination unit.

According to a seventh aspect of the present invention, the motor drive device as described in the sixth aspect may further include an alarm output unit (for example, the alarm output unit 19 described later) that outputs an alarm to a user in a case of receiving the abnormality signal.

A motor driving method according to an eighth aspect of the present invention is a motor driving method for supplying electric power from a power element to a motor, and dissipating heat of the power element by way of a heat sink, the method including: a temperature detecting step of detecting an actual temperature of the heat sink; an electric current detecting step of detecting electric current from the power element to the motor; an actual temperature variation calculating step of calculating an actual temperature variation of the heat sink relative to time, from the actual temperature of the heat sink detected in the temperature detecting step; an estimated temperature variation calculating step of calculating an estimated temperature variation of the heat sink relative to time, from an estimated temperature of the heat sink calculated based on the electric current detected in the electric current detecting step; and a temperature abnormality determining step of determining existence of a temperature abnormality of the heat sink according to whether or not the actual temperature variation calculated in the actual temperature variation calculating step is departing from a permitted range based on the estimated temperature variation calculated in the estimated temperature variation calculating step.

According to the present invention, it becomes possible to precisely detect abnormality of a heat sink with a motor drive device, by determining the existence of a temperature abnormality of the heat sink, according to whether or not an actual temperature variation of the heat sink is departing from a permitted range based on an estimated temperature variation of the heat sink.

DETAILED DESCRIPTION OF THE INVENTION

Figure 1:
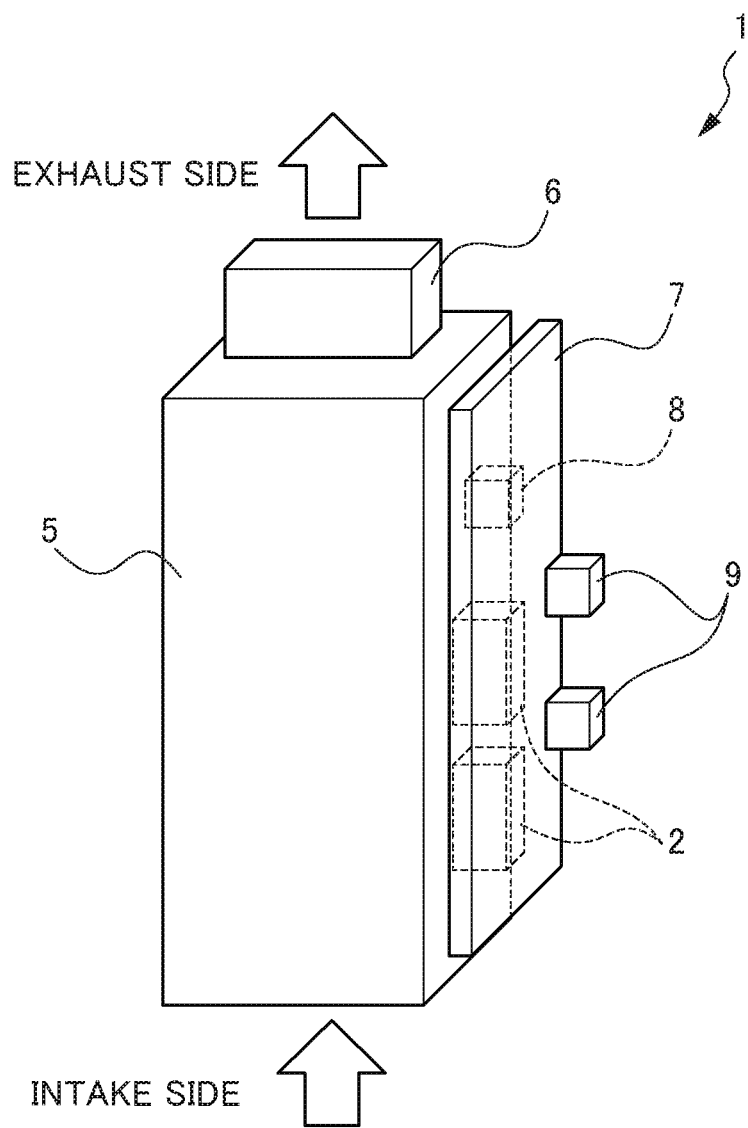
FIG. 1 is a perspective view showing the configuration of a motor drive device according to an embodiment of the present invention.
Figure 2:
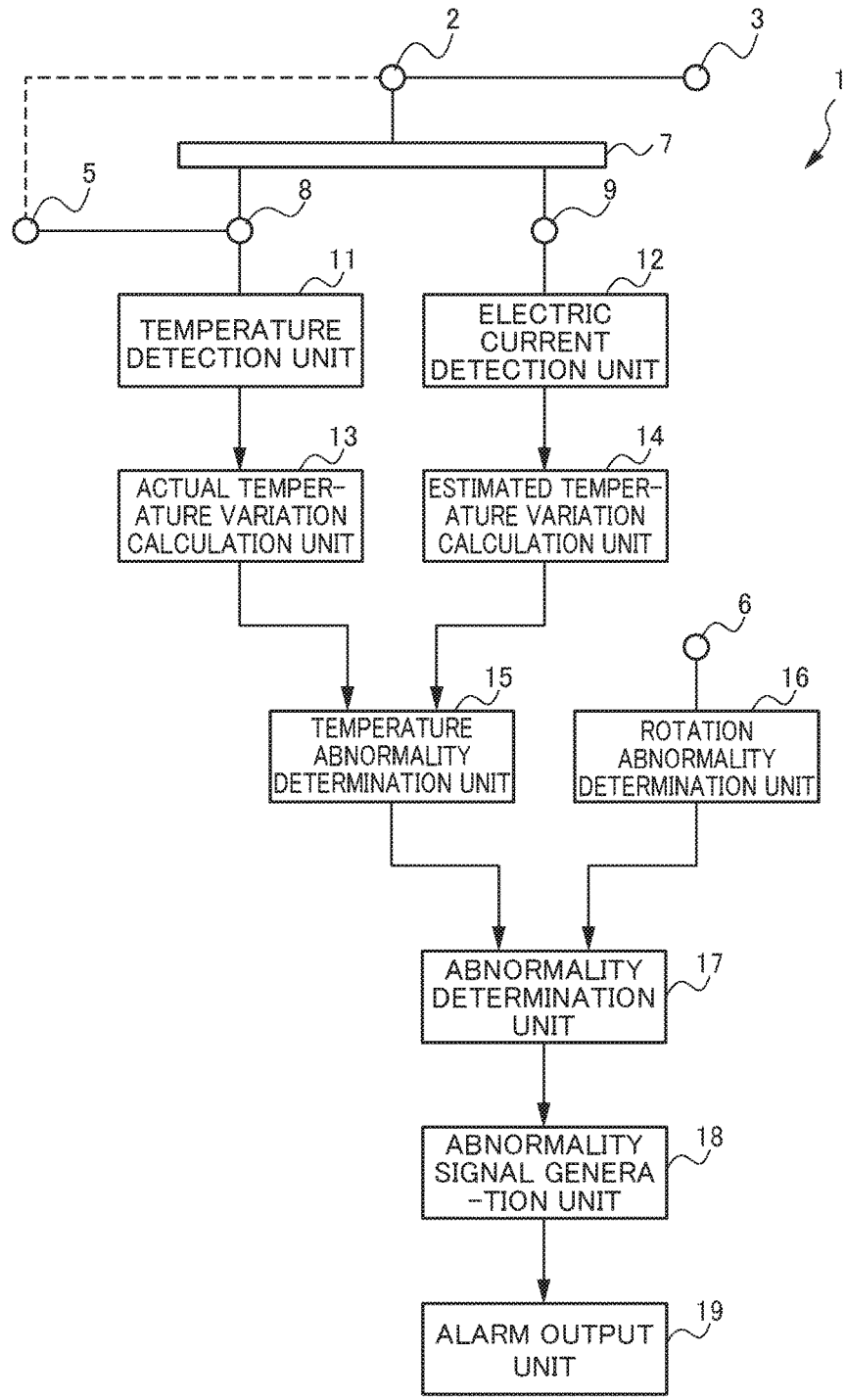
FIG. 2 is a block diagram showing a control system of the motor drive device according to the embodiment of the present invention.

Hereinafter, an example of an embodiment of the present invention will be explained. FIG. 1 is a perspective view showing the configuration of a motor drive device 1 according to the embodiment of the present invention. FIG. 2 is a block diagram showing the control system of the motor drive device 1 according to the embodiment of the present invention.

The motor drive device 1 includes a power element 2, heat sink 5, and cooling fan 6, as shown in FIG. 1. Then, as shown in FIG. 2, by supplying electric power from the power element 2 to a motor 3 that drives the feed shaft of a machine tool, arm of an industrial robot, etc. and dissipating heat of the power element 2 by the heat sink 5, as well as causing fluid on the flow path of the heat sink 5 to flow by the cooling fan 6, it causes the motor 3 to rotate, while efficiently radiating the power element 2 so as to prevent defects due to heat generation of the power element 2 as has happened previously.

Herein, the motor drive device 1 has a printed circuit board 7, and two electric current detection elements 9 are mounted on one surface of the printed circuit board 7 (surface on right side in FIG. 1). On the other surface of the printed circuit board (surface on left side in FIG. 1), a temperature detection element 8 and two of the power elements 2 are mounted. To this temperature detection element 8 and power elements 2, the heat sink 5 is installed in a closely adhering state. The cooling fan 6 is mounted to an exhaust side of the heat sink 5, and it is configured so that fluid in the flow channel of the heat sink 5 is made to flow from an intake side to the exhaust side by driving this cooling fan 6.

Furthermore, as shown in FIG. 2, the motor drive device 1, as the control system thereof, includes a temperature detection unit 11, electric current detection unit 12, actual temperature variation calculation unit 13, estimated temperature variation calculation unit 14, temperature abnormality determination unit 15, rotation abnormality determination unit 16, abnormality determination unit 17, abnormality signal generation unit 18, and alarm output unit 19.

The temperature detection unit 11 detects the actual temperature of the heat sink 5 via the temperature detection element 8.

The electric current detection unit 12 detects the electric current from the power element 2 to the motor 3 via the electric current detection element 9.

The actual temperature variation calculation unit 13 calculates the actual temperature variation of the heat sink 5 relative to time from the actual temperature of the heat sink 5 detected by the temperature detection unit 11.

Herein, "actual temperature variation of the heat sink 5 relative to time" represents how the actual temperature of the heat sink 5 fluctuates accompanying the elapse of time. As one example thereof, a value arrived at by dividing the actual temperature of the heat sink 5 by time (when displayed in units, ° C./min) can be considered.

The estimated temperature variation calculation unit 14 calculates an estimated temperature based on the electric current detected by the electric current detection unit 12, and calculates the estimated temperature variation of the heat sink 5 relative to time from this estimated temperature.

Herein, "estimated temperature variation of the heat sink 5 relative to time" represents how the estimated temperature of the heat sink 5 fluctuates accompanying the elapse of time. As one example thereof, a value arrived at by dividing the estimated temperature of the heat sink 5 by time (when displayed in units, ° C./min) can be considered.

The temperature abnormality determination unit 15 determines the existence of a temperature abnormality of the heat sink 5, according to whether or not the actual temperature variation of the heat sink 5 calculated by the actual temperature variation calculation unit 13 departs from a permitted range based on the estimated temperature variation of the heat sink 5 calculated by the estimated temperature variation calculation unit 14.

For example, in the case of the permitted range based on the estimated temperature variation of the heat sink 5 being 5 to 9° C./min, if the actual temperature variation of the heat sink 5 is 8° C./min, it is determined that a temperature abnormality is not occurring in the heat sink 5 (is normal), and if the actual temperature variation of the heat sink 5 is 11° C./min, it is determined that a temperature abnormality is occurring in the heat sink 5.

More specifically, the temperature abnormality determination unit 15 calculates a difference between the actual temperature variation of the heat sink 5 calculated by the actual temperature variation calculation unit 13, and the estimated temperature variation of the heat sink 5 calculated by the estimated temperature variation calculation unit 14, and in the case of this difference exceeding a predetermined threshold, determines as a temperature abnormality of the heat sink 5 occurring, and in the case of this difference not exceeding the predetermined threshold, determines as a temperature abnormality of the heat sink 5 not occurring.

Upon determining the existence of a temperature abnormality of the heat sink 5 in this way with the temperature abnormality determination unit 15, this determination is executed according to whether or not the actual temperature variation of the heat sink 5 is departing from the permitted range based on the estimated temperature variation of the heat sink 5. Therefore, compared to Prior Art 1, it is possible to precisely detect a temperature abnormality of the heat sink 5.

In other words, with Prior Art 1, since the existence of an abnormality is determined based simply on the difference between the actual temperature and estimated temperature of the heat sink 5 (when displayed in units, ° C.) as mentioned above, if the threshold for determining the existence of abnormality is not set well, detection of an abnormality may not necessarily be performed appropriately. In contrast, with the motor drive device 1 according to the present embodiment, since the existence of an abnormality is determined based on the temperature variation of the heat sink 5 (when display in units, ° C./min) rather than the temperature itself, it becomes possible to precisely detect a temperature abnormality of the heat sink 5 by predicting (foreseeing) the future temperature variation of the heat sink 5.

The rotation abnormality determination unit 16 determines the existence of a rotation abnormality of the cooling fan 6 by way of a well-known technique.

The abnormality determination unit 17 determines the existence of a temperature abnormality of the heat sink 5 or a rotation abnormality of the cooling fan 6, based on the determination results of the temperature abnormality determination unit 15 and rotation abnormality determination unit 16. More specifically, in a case of determining that rotation abnormality of the cooling fan 6 is not occurring by way of the rotation abnormality determination unit 16, and determining that a temperature abnormality of the heat sink 5 has occurred by way of the temperature abnormality determination unit 15, it is determined that the abnormality location is the heat sink 5.

The abnormality signal generation unit 18 generates an abnormality signal in the case of determining that a temperature abnormality of the heat sink 5 or a rotation abnormality of the cooling fan 6 has occurred by way of the temperature abnormality determination unit 15 or rotation abnormality determination unit 16.

The alarm output unit 19 outputs an alarm to the user, in the case of receiving an abnormality signal generated by the abnormality signal generation unit 18.

Figure 3:
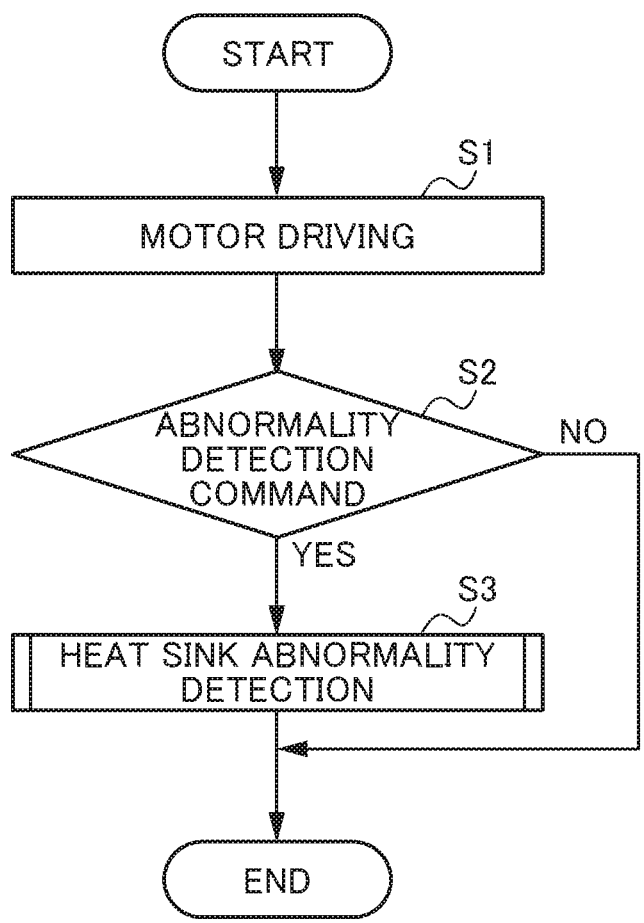
FIG. 3 is a flowchart showing processing until an abnormality detection command of the motor drive device according to the embodiment of the present invention.

FIG. 3 is a flowchart showing the processing up until an abnormality detection command of the motor drive device according to the embodiment of the present invention.

In Step S1, a main control unit (not illustrated) drives the motor 3.

In Step S2, the main control unit (not illustrated) determines whether or not an abnormality detection command was outputted. In the case of this determination being YES, the processing advances to Step S3, and in the case of this determination being NO, the processing is ended.

In Step S3, the main control part (not illustrated) executes abnormality detection processing in the motor drive device 1.

Figure 4:
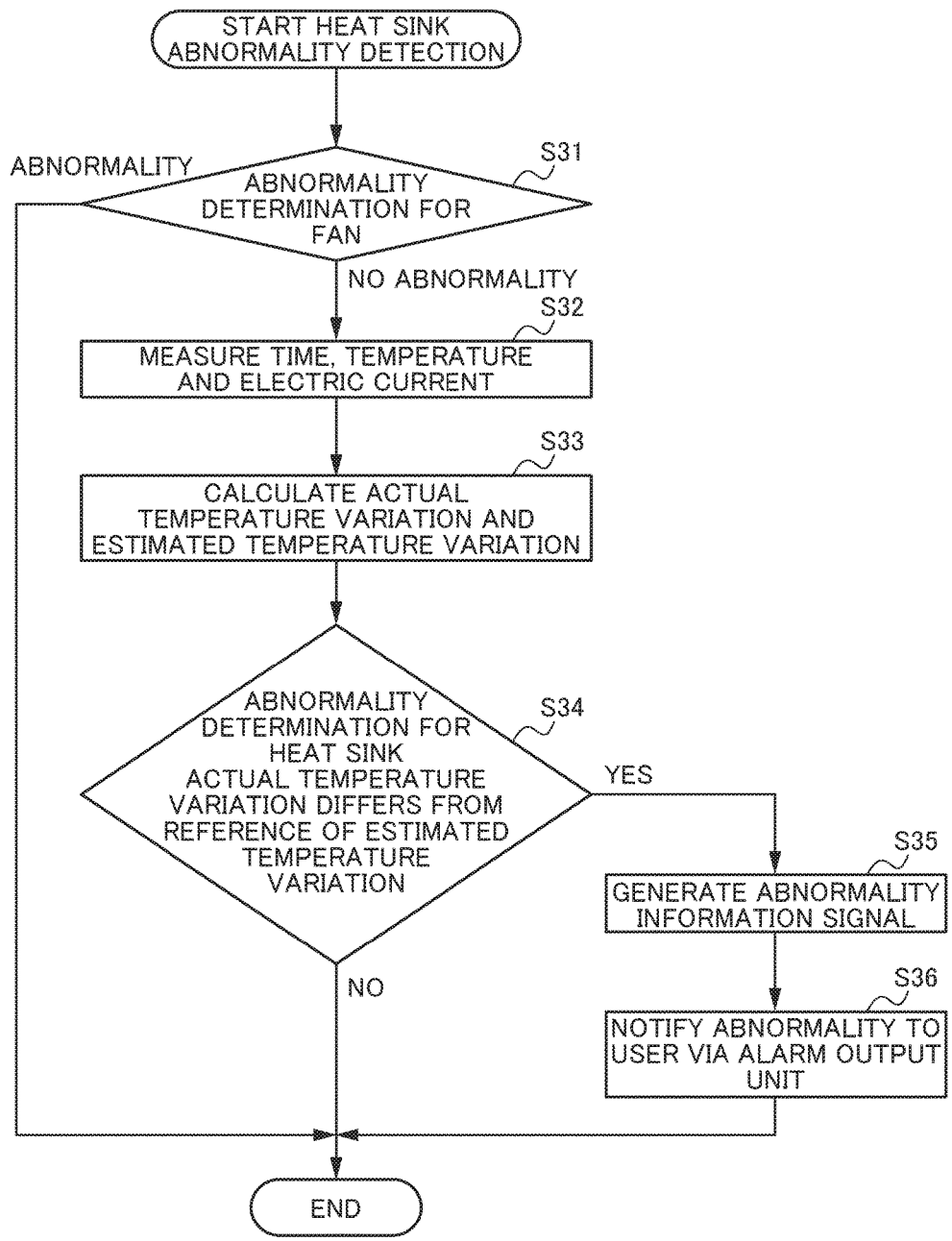
FIG. 4 is a flowchart showing abnormality detection execution processing of the motor drive device according to the embodiment of the present invention.

FIG. 4 is a flowchart showing this abnormality detection processing.

In Step S31, the rotation abnormality detection unit 16 determines the existence of a rotation abnormality of the cooling fan 6. As a result thereof, in the case of there being a rotation abnormality of the cooling fan 6, the processing is ended, and in the case of there not being a rotation abnormality of the cooling fan 6, the processing advances to Step S32.

In Step S23, the temperature detection unit 11 measures the time as well as detecting the actual temperature of the heat sink 5, and the electric current detection unit 12 measures the time as well as detecting the electric current from the power element 2 to the motor 3.

In Step S33, the actual temperature variation calculation unit 13 calculates the actual temperature variation of the heat sink 5 relative to time, and the estimated temperature variation calculation unit 14 calculates the estimated temperature variation of the heat sink 5 relative to time.

In Step S34, the temperature abnormality determination unit 15 determines the existence of a temperature abnormality of the heat sink 5. Therein, it is determined whether the actual temperature variation calculated by the actual temperature variation calculation unit 13 is departing from the permitted range based on the estimated temperature variation calculated by the estimated temperature variation calculation unit 14. In the case of this determination being YES, the processing advances to Step S35, and in the case of this determination being NO, the processing is ended.

In Step S35, the abnormality signal generation unit 18 receives a signal of the fact that a temperature abnormality of the heat sink 5 is occurring, and generates an abnormality signal.

In Step S36, the alarm output unit 19 receives the abnormality signal generated by the abnormality signal generation unit 18, and outputs the alarm to the user.

According to the present embodiment as above, it is possible to more precisely detect abnormality of the heat sink 5, due to determining the existence of a temperature abnormality of this heat sink 5, according to whether or not the actual temperature variation of the heat sink 5 is departing from the permitted range based on the estimated temperature variation of the heat sink 5. As a result thereof, it is possible to rapidly specify the abnormality location of the motor drive device 1, and it becomes possible to shorten the maintenance time of the motor drive device 1.

Although an embodiment of the present invention has been explained above, the present invention is not to be limited to the aforementioned embodiment. In addition, the effects described in the present embodiment merely exemplify the most preferred effects produced from the present invention, and the effects according to the present invention are not to be limited to the effects described in the present embodiment.

In the abnormality detection processing (FIG. 4) of the present embodiment, the case of generating an abnormality signal and outputting an alarm to the user only when a temperature abnormality of the heat sink 5 occurred is explained. However, the abnormality signal may be generated to output an alarm to the user only when a rotation abnormality of the cooling fan 6 occurs. In addition, when either of the temperature abnormality of the heat sink 5 and rotation abnormality of the cooling fan 6 occurs, it may generate an abnormality signal and output an alarm to the user.

A control method according to the motor drive device 1 is realized by way of software. In the case of being realized by software, the programs constituting this software are installed to a computer (motor drive device 1). In addition, these programs may be stored (recorded) in the removable media, and distributed to the user, or may be distributed by being download to the user's computer via a network. Furthermore, these programs may be provided to the user's computer as a Web service via a network, without being downloaded.

EXPLANATION OF REFERENCE NUMERALS 1 motor drive device
2 power element
3 motor
5 heat sink
6 cooling fan
11 temperature detection unit
12 electric current detection unit
13 actual temperature variation calculation unit
14 estimated temperature variation calculation unit
15 temperature abnormality determination unit
16 rotation abnormality determination unit
17 abnormality determination unit
18 abnormality signal generation unit
19 alarm output unit

What is claimed is:

1. A motor drive device that supplies electric power from a power element to a motor and dissipates heat from the power element by way of a heat sink, the motor drive device comprising:
    a temperature detection unit that detects an actual temperature of the heat sink;
    an electric current detection unit that detects electric current from the power element to the motor;
    an actual temperature variation calculation unit that calculates an actual temperature variation of the heat sink relative to time, from the actual temperature of the heat sink detected by the temperature detection unit;
    an estimated temperature variation calculation unit that calculates an estimated temperature variation of the heat sink relative to time, from an estimated temperature of the heat sink calculated based on the electric current detected by the electric current detection unit; and
    a temperature abnormality determination unit that determines existence of a temperature abnormality in the heat sink, according to whether or not the actual temperature variation calculated by the actual temperature variation calculation unit is departing from a permitted range based on the estimated temperature variation calculated by the estimated temperature variation calculation unit.

2. The motor drive device according to claim 1, wherein the temperature abnormality determination unit determines that a temperature abnormality of the heat sink occurred, in a case of a difference between the actual temperature variation calculated by the actual temperature variation calculation unit and the estimated temperature variation calculated by the estimated temperature variation calculation unit exceeding a predetermined threshold.

3. The motor drive device according to claim 1, wherein the heat sink has a flow channel of fluid, and
    wherein the motor drive device further comprises a cooling fan causing the fluid in the flow channel of the heat sink to flow; and
    a rotation abnormality determination unit that determines existence of a rotation abnormality in the cooling fan.

4. The motor drive device according to claim 3, further comprising an abnormality determination unit that determines existence of a temperature abnormality of the heat sink or a rotation abnormality of the cooling fan, based on determination results of the temperature abnormality determination unit and the rotation abnormality determination unit.

5. The motor drive device according to claim 4, wherein the abnormality determination unit determines that an abnormality location is the heat sink, in a case of being determined that a rotation abnormality of the cooling fan is not occurring by way of the rotation abnormality determination unit, and being determined that a temperature abnormality of the heat sink occurred by way of the temperature abnormality determination unit.

6. The motor drive device according to claim 3, further comprising an abnormality signal generation unit that generates an abnormality signal, in a case of being determined that a temperature abnormality of the heat sink or a rotation abnormality of the cooling fan occurred by way of the temperature abnormality determination unit or the rotation abnormality determination unit.

7. The motor drive device according to claim 6, further comprising an alarm output unit that outputs an alarm to a user in a case of receiving the abnormality signal.

8. A motor driving method for supplying electric power from a power element to a motor, and dissipating heat of the power element by way of a heat sink, the method comprising:
- a temperature detecting step of detecting an actual temperature of the heat sink;
- an electric current detecting step of detecting electric current from the power element to the motor;
- an actual temperature variation calculating step of calculating an actual temperature variation of the heat sink relative to time, from the actual temperature of the heat sink detected in the temperature detecting step;
- an estimated temperature variation calculating step of calculating an estimated temperature variation of the heat sink relative to time, from an estimated temperature of the heat sink calculated based on the electric current detected in the electric current detecting step; and
- a temperature abnormality determining step of determining existence of a temperature abnormality of the heat sink according to whether or not the actual temperature variation calculated in the actual temperature variation calculating step is departing from a permitted range based on the estimated temperature variation calculated in the estimated temperature variation calculating step.

* * * * *